(12) United States Patent
Liu et al.

(10) Patent No.: US 11,531,946 B2
(45) Date of Patent: Dec. 20, 2022

(54) OPTIMIZING MACHINE LEARNING MODEL TOTAL PAYMENT VOLUME PREDICTIONS USING MODEL STACKING

(71) Applicant: PayPal, Inc., San Jose, CA (US)

(72) Inventors: Yifan Liu, San Jose, CA (US); Sree R. Velaga, San Jose, CA (US); Greg Anthony Vannoni, San Jose, CA (US); Haiou Wang, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 60 days.

(21) Appl. No.: 16/916,831

(22) Filed: Jun. 30, 2020

(65) Prior Publication Data
US 2021/0406796 A1    Dec. 30, 2021

(51) Int. Cl.
| | | |
|---|---|---|
| *G06Q 10/06* | (2012.01) |
| *G08B 21/18* | (2006.01) |
| *G06N 20/00* | (2019.01) |
| *G06N 5/04* | (2006.01) |
| *G06Q 10/04* | (2012.01) |
| *G06Q 40/00* | (2012.01) |

(52) U.S. Cl.
CPC ......... *G06Q 10/06315* (2013.01); *G06N 5/04* (2013.01); *G06N 20/00* (2019.01); *G06Q 10/04* (2013.01); *G06Q 40/12* (2013.12); *G08B 21/182* (2013.01)

(58) Field of Classification Search
CPC .. G06Q 10/06315; G06Q 40/12; G06Q 10/04; G06N 20/00; G06N 5/04; G08B 21/182
USPC ....................................................... 705/7.25
See application file for complete search history.

(56) References Cited

U.S. PATENT DOCUMENTS

| | | | | |
|---|---|---|---|---|
| 10,229,370 B1* | 3/2019 | Merritt | ................... | G06N 20/00 |
| 10,325,220 B2* | 6/2019 | Li | .......................... | G06N 20/00 |
| 10,438,212 B1* | 10/2019 | Jilani | ..................... | G06N 5/025 |
| 10,789,266 B2* | 9/2020 | Bhabesh | ............ | G06F 16/1824 |

(Continued)

OTHER PUBLICATIONS

Elastic Resource Management in Cloud Computing Platforms, Upendra Sharma, University of Massachusetts Amherst, 2013 (Year: 2013).*

(Continued)

*Primary Examiner* — Abdallah A El-Hage Hassan
(74) *Attorney, Agent, or Firm* — Haynes and Boone, LLP

(57) ABSTRACT

This specification includes machine learning model stacking techniques allowing for greater predictive accuracy using disparate sources of data. In one embodiment, a system obtains TPV data and inputs the TPV data into a forecasting model. Based on the total payment volume data, the forecasting model may output a first prediction of a total payment volume for a future period of time. The system may acquire prediction enhancing data and input the first prediction from the forecasting model and the acquired prediction enhancing data into a machine learning model. Based on the first prediction and the acquired prediction enhancing data, the machine learning model may output a second prediction of the total payment volume for the future period of time. The second prediction may be compared against real-time TPV and determined differences may be used for controlling operations of various machines system/network environment machines.

20 Claims, 4 Drawing Sheets

(56) References Cited

U.S. PATENT DOCUMENTS

| | | | | |
|---|---|---|---|---|
| 2009/0010168 | A1* | 1/2009 | Yurchenko | H04L 45/70 370/237 |
| 2015/0332222 | A1* | 11/2015 | Wang | G06Q 20/027 705/39 |
| 2016/0071072 | A1* | 3/2016 | Bailo | G06Q 20/384 705/40 |
| 2017/0316450 | A1* | 11/2017 | Kobylkin | G06N 5/04 |
| 2018/0204265 | A1* | 7/2018 | Malviya | G06F 40/55 |
| 2018/0337895 | A1* | 11/2018 | Hannikainen | G06F 16/903 |
| 2018/0350004 | A1* | 12/2018 | Scherrer | G06Q 40/06 |
| 2019/0294740 | A1* | 9/2019 | Matsubara | G06Q 10/04 |
| 2019/0370716 | A1* | 12/2019 | Kavumpurath | G06N 20/00 |
| 2020/0134642 | A1* | 4/2020 | Morgan | G06Q 30/0202 |
| 2021/0166140 | A1* | 6/2021 | Cheng | G06Q 10/0635 |
| 2021/0221247 | A1* | 7/2021 | Daniel | B60L 53/68 |

OTHER PUBLICATIONS

Upendra Sharma "Elastic Resource Management in Cloud Computing Platforms" University of Massachusetts Amherst https://scholarworks.umass.edu/open_access_dissertations, 2013 (Year: 2013).*

Bohdan Pavlyshenko, "Using Stacking Approaches for Machine Learning Models" IEEE Second International Conference on Data Stream Mining & Processing Aug. 21-25, 2018, Lviv, Ukraine, 2018 (Year: 2018).*

* cited by examiner

OPTIMIZING MACHINE LEARNING MODEL TOTAL PAYMENT VOLUME PREDICTIONS USING MODEL STACKING

TECHNICAL FIELD

The present disclosure generally relates to machine learning and more particularly to using model stacking to optimize machine learning model predictions according to various embodiments.

BACKGROUND

Modeling and predicting any quantity with accuracy is a technical challenge that depends on effectively selecting and using various data sources. The appropriate modeling architecture is also necessary to best leverage these data. Very simple modeling techniques might rely on linear projections, while more complex modeling techniques might rely on machine learning models. Even within the realm of machine learning, however, experimentation and development resources are necessary to provide improvement in certain areas. Applicant recognizes that within this technical context, accurately modeling total payment volume (or "TPV") is an area that can be significantly improved.

Figure 1:
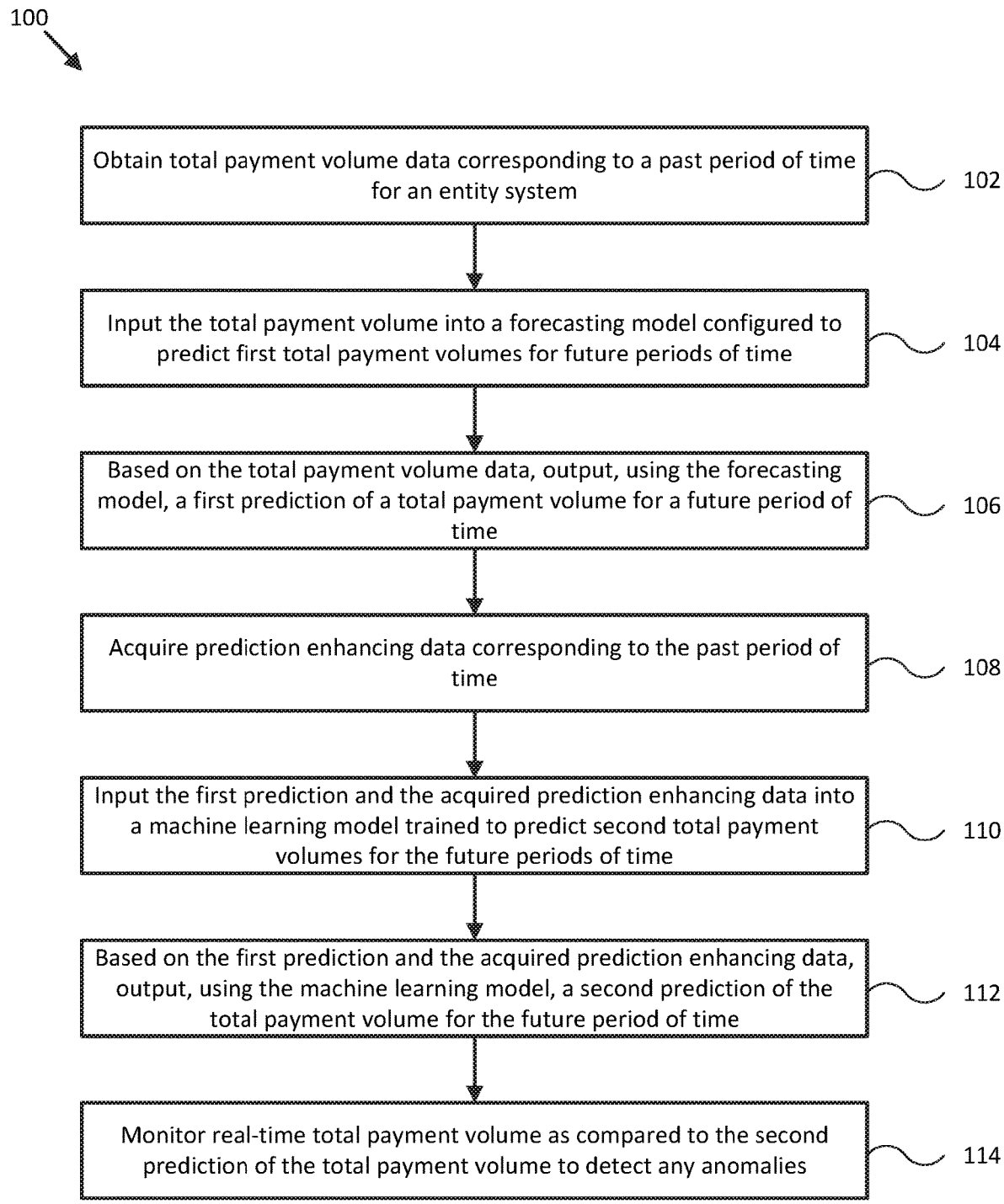
FIG. 1 illustrates a flow diagram of a process for predicting TPV values using model stacking in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

This specification includes references to "one embodiment," "some embodiments," "an embodiment," "various embodiments," etc. The appearances of these phrases do not necessarily refer to the same embodiment. However, it will be appreciated that particular features, structures, and/or characteristics may be combined in a suitable manner consistent with this disclosure.

"First," "second," and so forth are used herein to describe various embodiments. Such terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not turned on). Reciting that a component is "configured to" perform one or more tasks is expressly intended not to invoke 35 U.S.C. § 112(f) for that component.

According to some embodiments, Total Payment Volume or "TPV" may be defined as the value of payments (in some instances net payments not including payment reversals) successfully completed through a particular entity or system (e.g. such as a payment services provider's platform). An entity such as a service provider may track its TPV for a variety of reasons, including the ability to detect potential technical problems with one of its computer systems. A deviation from expected TPV can indicate a problem with the hundreds or thousands of computer servers that are used to service incoming network data requests, for example, or can indicate a problem with back-end databases, a network connection, etc. Thus, for example, when TPV is observed to be decreasing, the service provider may check whether hardware and software integrated into its platform are operating as normal. The present disclosure describes systems and methods that improve over previous systems and methods by optimizing machine learning models in predicting TPV, where the predicted TPV can be compared against real-time TPV (e.g., by monitoring) to determine anomalies (e.g., differences between the predicted TPV and real-time TPV over a threshold time period). The determined anomalies and any helpful information related thereto may be employed to automate remediation (e.g., debugging, repairing, rolling back, restarting, updates, system environment adjustments, etc.), at least partially, to any hardware and/or software on the service provider's platform.

In some embodiments, model stacking (e.g. combined use of two different models) systems and methods for TPV predictions may include requesting/obtaining/fetching TPV data corresponding to a past period of time for an entity system (e.g., service provider), as well as any variety of other related data. The systems and methods may further include inputting the TPV data into a forecasting model that is configured to predict first total payment volumes for future periods of time. For example, parameters of the forecasting model may be tuned to apply various weights to time periods in its predictions. Seasonality parameters such as holidays, weekends, weekdays, large sporting event days, nationally recognized shopping days, seasons, and so forth may be weighted differently to provide a more accurate total payment volumes prediction by the forecasting model. Based on the TPV data, the forecasting model may output a first prediction of TPV for a future period of time. The systems and methods may further include acquiring prediction enhancing data corresponding to the past period of time (e.g., from databases or servers internal or external to the entity system/service provider). For example, the prediction enhancing data may be macroeconomic data that is expected to be correlated to TPV for the service provider. For example, the prediction enhancing data may include indices, earnings reports, and economic summaries such as an unemployment rate, quits rate (e.g., a number of employee quits during a month as a percent of total employment), housing starts, consumer price index (e.g., measurements of inflation), consumer leverage ratio, industrial production, bankruptcies, gross domestic product, broadband internet access, retail sales, stock market prices (e.g., S&P 500 index prices, stock market indices, individual stock prices), cryptocurrency prices, commodity prices, and/or money supply changes. Internally tracked metrics for the service provider may likewise be included in the prediction enhancing data. For example, user account logins, CPU/memory usage, network traffic, received API requests, and so forth may be included in the prediction enhancing data. The predication enhancing data may be time series data. In some embodiments, the systems and methods may include generating additional prediction enhancing data based on the acquired prediction enhancing data such as modifying time series daily S&P 500 prices to generate weekly or monthly averages of the S&P 500 prices.

The first prediction outputted by the forecasting model and the acquired prediction enhancing data may be inputted into a machine learning model that has been trained to predict second total payment volumes for the future periods of time. For example, the machine learning model may be trained using training data including at least historical TPV data, historical predicted first total payment volumes outputted by the forecasting model, and historical prediction enhancing data (e.g., acquired and generated). Based on the first prediction and the acquired prediction enhancing data inputted to the machine learning model, the machine learning model may output a second prediction of the TPV for the future period of time. In some embodiments, the second prediction of the TPV for the future period of time may be tested/confirmed to be more accurate than the first prediction of the TPV outputted by the forecasting model based on a mean absolute percentage error (MAPE) basis.

In further embodiments, the systems and methods may include determining real-time TPV for the entity system and comparing the real-time TPV to the second prediction of the TPV outputted by the machine learning model. In response to a difference or anomaly being determined/detected between the real-time TPV and the second prediction of the TPV outputted by the machine learning model, one or more actions may be performed. For example, the second prediction of TPV may exceed the real-time TPV. In such cases, a predicted peak payments per minute (PPPM) of the second prediction could be used to adjust a network infrastructure or server of the entity system, e.g., to have a server traffic capacity that accommodates the predicted PPPM.

As another example of an action that can be performed in response to the difference or anomaly being determined/ detected between the real-time TPV and the second prediction of the TPV outputted by the machine learning model, an alert may be sent to a user device alerting the user through a user interface of the user device about the difference or anomaly.

As another example of an action that can be performed in response to the difference or anomaly being determined/ detected between the real-time TPV and the second prediction of the TPV outputted by the machine learning model, the systems and methods may include automatically performing a rollback of one or more recently released software versions and/or a rollout of a previous software version.

As another example of an action that can be performed in response to the difference or anomaly being determined/ detected between the real-time TPV and the second prediction of the TPV outputted by the machine learning model, the systems and methods may include updating an interactive voice response software to provide incoming calls with an automated response related to the anomaly such as an explanation that customer service wait times may be longer due to increased demand.

As another example of an action that can be performed in response to the difference or anomaly being determined/ detected between the real-time TPV and the second prediction of the TPV outputted by the machine learning model, the systems and methods may include automatically restarting machines in the entity system in response to detecting an anomaly. For example, the systems and methods may include determining which machines have been impacted in correlation with the anomaly and sending a direct message to an associated support team to request remediation of any hardware/software issue of the machine(s).

In yet another example of an action that can be performed in response to the difference or anomaly being determined/ detected between the real-time TPV and the second prediction of the TPV outputted by the machine learning model, the systems and methods may include enabling log gathering in response to detecting the anomaly. For example, data may be automatically entered into a database so that the data can assist in debugging to understand what could have caused the anomaly. Conversely, automatic deletion of logs may be paused to preserve data that may be relevant in understanding why the anomaly occurred.

Thus, the present disclosure provides for techniques for optimizing machine learning model TPV predictions, which results in improved machine learning models and consequently improved network and system environments as machines related to TPV may be debugged, adjusted, transformed, repaired, etc. in a time-efficient manner based on the TPV predictions. Additional advantages of the subject technology will be further apparent in view of the description below.

Now referring to FIG. 1, illustrated is a flow diagram of a process 100 for using model stacking to improve machine learning models and their TPV predictions in accordance with one or more embodiments of the present disclosure. For explanatory purposes, the process 100 is primarily described herein with reference to FIG. 2; however, the process 100 is not limited to FIG. 2. The blocks of the process 100 are described herein as occurring in serial, or linearly (e.g., one after another). However, multiple blocks of the process 100 may occur in parallel. In addition, the blocks of the process 100 (or steps, sub-steps, or sub-processes therein) need not be performed in the order shown and/or one or more blocks (or steps, sub-steps, or sub-processes therein) may be omitted from or added to the process 100. In various embodiments, some or all elements of the method of FIG. 1 may be performed by TPV forecasting system 206 as described below.

At block 102, a TPV forecasting system 206 (shown and described with reference to FIG. 2) may obtain/acquire Total Payment Volume (TPV) data corresponding to a past period of time for an entity system (e.g., a service provider). For example, where a service provider provides and manages a platform for online payments/transfers between end users, TPV may be the value of payments (in some instances, net of payment reversals), successfully completed through the service provider's platform. In one embodiment, TPV data may include a TPV (e.g., represented as a dollar/currency amount) over a period of time such as a day, year, month, week, quarter, hour, minute, second, etc. The service provider may track the TPV data in real-time as users engage in activity on the service provider's platform. The real-time TPV data may be stored in a database and organized to create historic TPV data that the service provider may use in model tuning and/or training as well as making TPV predictions as discussed herein. Thus, the system 206 may query the database to retrieve/fetch the TPV data (real-time or historic). In some embodiments, the real-time TPV data and historic TPV data may be stored in one or more databases that may be collectively referred to as a single database in some instances herein. In the embodiment shown in FIG. 2, the TPV data may be included in input 202*a* that is fed to a model 1 and a model 2 of the system 206 as further discussed below.

Figure 2:
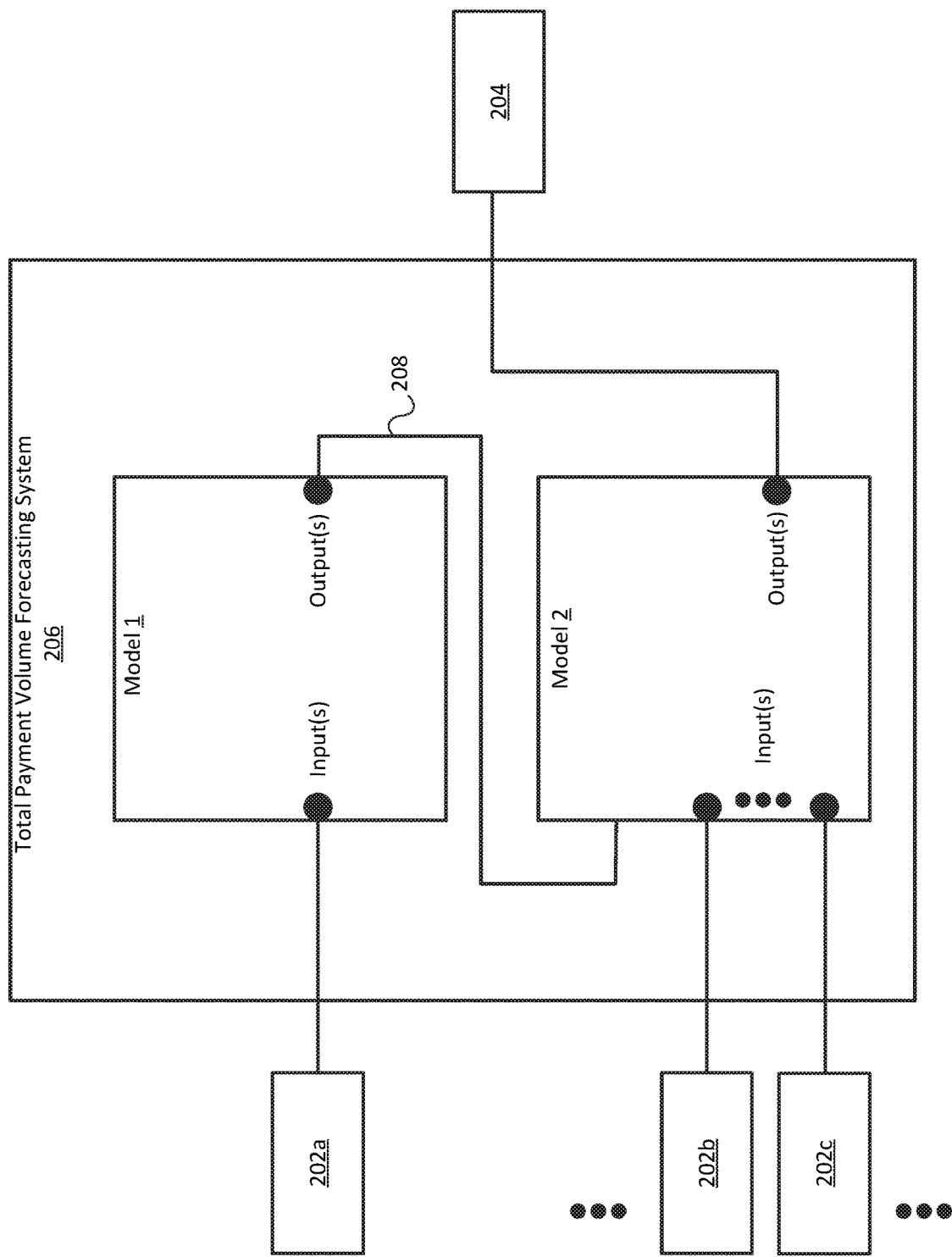
FIG. 2 illustrates a block diagram of a TPV forecasting system suitable for implementing one or more embodiments of the present disclosure.

At block 104, the system 206 may input the TPV data into a forecasting model configured to predict first total payment volumes for future periods of time. For example, as shown in the embodiment of FIG. 2, the input 202*a*, which may include the TPV data acquired at block 102, may be inputted to the model 1. The model 1 may be a forecasting model configured to predict first total payment volumes for future periods of time. In one embodiment, the model 1 may be a forecasting algorithm that takes non-linear trends (e.g., historical TPV time series data), linear trends, and/or selected tuning parameters (e.g., weighting) based on yearly, weekly, and daily seasonality plus holiday effects and provides a time series TPV forecast/prediction for future periods of time. The model 1 may be implemented utilizing Facebook™ Prophet for example. In some embodiments, model 1 could be a machine learning based model, while in other embodiments model 1 may not employ machine learning techniques.

In various embodiments, the model 1 may be tuned to generate an accurate forecasting model prior to its use in the process 100. For example, historical TPV time series data may be used to tune the forecasting model to generate an accurate prediction for future TPV times series data. To illustrate, historic TPV times series data over a previous three years may be used to tune the forecasting model. The earliest two years in time may be used as training data to generate TPV predictions that can be compared against TPV for the most recent third year in time to test the accuracy of the forecasting model. Depending on the results of the forecasting model, it may be further tuned by, for example, weighting certain days differently than others (e.g., tuning seasonality parameters). To illustrate, certain days such as holidays, weekends, seasons, days of large public events, nationally recognized shopping days, and so forth may be given different weights to tune the forecasting model to provide better TPV predictions. For example, on Christmas, TPV may be expected to be less than on a weekend day before Christmas as people are expected to spend less on Christmas day than the weekend leading up to Christmas day. According to some implementations, the forecasting model may be tuned until the predictions based on the two earlier years are sufficiently accurate when compared to the validation TPV data of the third year. In one embodiment, a mean absolute percentage error (MAPE) calculation may be used to determine whether the forecasting model is sufficiently accurate for a desired application. For example, parameters of the forecasting model may be tuned until a MAPE of 5% or less is achieved. In some embodiments, tuning the seasonality parameters may be automated or/and performed manually until the desired MAPE is achieved.

At block 106, the system 206 may output, using the model 1, a first prediction 208 of total payment volume for a future period of time based on the inputted TPV data at block 104. The time step granularity of the first prediction 208 over the future period of time may be selected. For example, the first prediction 208 may include total payment volume corresponding to each second, minute, hour, day, week, month, etc. for the future period of time.

At block 108, the system 206 may acquire prediction enhancing data. For example, the prediction enhancing data may be time series data that corresponds to the period of time from which the TPV data was acquired at block 102. In some embodiments, time series data may mean a series of data points indexed in time order. The time series may be a sequence taken at successive equally spaced points in time (e.g., discrete time intervals, sequence of discrete-time data, etc.) For example, the successive equally spaced points in time may be in seconds, minutes, hours, days, weeks, months, quarters, years, etc. In some embodiments, the prediction enhancing data may include a plurality of time series data sequences corresponding to different types of data such as those discussed below.

In one embodiment, the system 206 may utilize an Application Programming Interface (API) (e.g., a Representational State Transfer (REST) API) to acquire the prediction enhancing data from a source available via the internet (e.g., a web site, database) or other network. In some embodiments, the prediction enhancing data may be data correlated or related to the TPV data. For example, the prediction enhancing data may be macroeconomic data that may be expected to be correlated to TPV for the service provider. For example, the prediction enhancing data may include indices, earnings reports, and economic summaries such as an unemployment rate, quits rate, housing starts, consumer price index (e.g., measurements of inflation), consumer leverage ratio, industrial production, bankruptcies, gross domestic product, broadband internet access, retail sales, stock market prices, and/or money supply changes.

In some embodiments, the prediction enhancing data may include a consumer confidence index such as the consumer confidence index published by The Conference Board, Inc. that measures consumer confidence or the degree of optimism on the state of the United States economy that consumers are expressing through their activities of savings and spending. Other consumer confidence indexes such as those corresponding to several countries around the world may be included in the prediction enhancing data.

In several embodiments, the prediction enhancing data may include user metrics associated with food order and delivery applications. For example, as food order and delivery application usage increases, TPV for a service provider may be expected to increase. User metrics may include a number of application download/installations of food order/delivery mobile applications, a number of orders placed, transaction volume for food orders, a number of logins to food order/delivery applications, and/or a number of API requests to food order and delivery servers.

In various embodiments, the prediction enhancing data may include cryptocurrency index data. For example, the cryptocurrency index data may correspond to the Bloomberg Galaxy Crypto Index (BGCI), which measures the performance of the largest cryptocurrencies traded in United States Dollars (USD). In some embodiments, the prediction enhancing data may include data corresponding to individual cryptocurrencies such as pricing for Bitcoin, Ethereum, Monero, Ripple, Zcash, etc. over certain days, weeks, months, and so forth.

According to an embodiment, the prediction enhancing data may include automobile traffic density and/or other user mobility metrics. In some embodiments, the metrics may include a number of vehicles traveling within, in, and/or out of a geographical location, a number of vehicles arriving at and/or leaving points of interests such as restaurants, grocery stores, theme parks, movie theaters, shopping stores/centers, and entertainment destinations, and/or travel speeds of vehicles within and/or out of a geographic location. In one embodiment, automobile traffic data such as that provided through Google Maps may be requested from Google™ APIs. In some embodiments, the metrics may include a number of users using public transportation such as public buses, subways, trains, and so forth. In other embodiments, the metrics may include a number of users using rideshare services such as a number of users using Lyft or Uber rideshare services. In some embodiments, the metrics may include users walking or running about certain geographical locations. For example, where less people are moving about a geographical location, their online activities may be expected to increase due to staying at home, and thus TPV may be expected to increase.

In some embodiments, the prediction enhancing data may include user account logins for the service provider. For example, an increase in the number of logins for the service provider may mean that TPV value is expected to increase.

Other internal data tracked by the service provider may also be used as prediction enhancing data. In one example, the prediction enhancing data may include fraud rates. For example, the service provider may track attempted fraud on its own service platform each day. As the fraud rate increase, the TPV would be expected to decrease.

In another example, the prediction enhancing data may include CPU and/or memory usage. For example, the service provider may track CPU and memory usage for its servers or request CPU/memory usage information from client devices where the CPU and/or memory usage has been allocated to applications associated with the service provider. As the CPU and/or memory usage increases, the TPV may be expected to also increase.

Similarly, network usage such as incoming and outgoing bytes may be tracked and included in the prediction enhancing data.

In yet a further example, the prediction enhancing data may include software release counts and/or rollbacks for the service provider. In this regard, changes to the service provider's system environment may be tracked such as when software is placed into a pipeline for pushing into operation.

In another example, the prediction enhancing data may include API requests received by the service provider at discrete time intervals over a past period of time (e.g., time series data, a number of API requests per second, minute, hour, day). For example, API requests can include any account registered with the service provider making an API requests to access any resources (information, data) or services of the service provider (e.g., the service provider's servers) such as transaction requests.

In some embodiments, the prediction enhancing data may be stored in an internal database of the service provider and fetched when needed. In some cases, the system 206 may scale the prediction enhancing data (e.g., to between −1 and 1) or otherwise cleanse/modify as needed. For example, prediction enhancing data may be scaled (e.g., normalized) so that the model 2 the prediction enhancing data is not amplified or underweighted, which could skew TPV predictions.

In some embodiments, the prediction enhancing data may be used to create/generate additional prediction enhancing data. For example, in a use case where the prediction enhancing data includes S&P 500 index data, the system 206 may generate rolling averages such as a daily average, weekly average, monthly average, and so forth. The acquired prediction enhancing data as well as the generated prediction enhancing data may be part of the prediction enhancing data included in the inputs 202b and 202c fed to the model 2 as shown in FIG. 2. Although FIG. 2 shows a limited number of inputs to the model 2, it will be appreciated that numerous prediction enhancing time series data may be inputted into the model 2. For example, the model 2 may be implemented to receive as input any combination of the above discussed prediction enhancing data. In some cases, more signals that are provided to the model 2 may provide for more accurate results.

At block 110, the system 206 may input the first prediction and the prediction enhancing data into the model 2. For example, the model 2 may be a machine learning model trained to predict second total payment volumes for the future periods of time. In some embodiments, the model 2 may be a long short-term memory (LSTM) model. The LSTM model may be trained based on training data, which may include historic TPV data, historic TPV predictions made by the model 1, and/or historic prediction enhancing data. In this regard, during the training process, the training data may be prepared so as to create examples from which the LSTM model can learn. For example, training examples may be formatted into a training data matrix that includes samples containing a number of inputs (e.g., time series inputs) and an output(s) (e.g., time series TPV outputs) that corresponds to the inputs. Various structures may be used for the data matrix. For example, for parallel time series inputs arranged in rows and time steps of the input times series arranged in columns, a number of rows and columns may be selected to correspond to an output when creating such samples. The LSTM model may analyze the training data matrix to learn a function that can be generalized to new input times series to generate TPV predictions that would be dependent on/based on the new input time series. Certain tuning parameters may be controlled (e.g., adjusted, selected, determined) to optimize the TPV predictions provided by the LSTM model. For example, the following parameters could be tuned (e.g., manually, automatically, semi-automatically) in training the LST model: a number of training epochs (e.g., training iterations), a batch size (e.g., the number of training examples utilized in one iteration, a number of neurons (e.g., in a neural network). In some embodiments, seasonality parameters such as certain holidays, weekdays, weekends, months, seasons, large sporting and/or shopping event days may be given more weight than ordinary days in the LSTM model under supervised learning. The LSTM model predictions may be tested against a validation set, which may be a TPV data set that is held back from the training set, to assess the LSTM model's accuracy before implementing the model in the system 206. For example, an earlier two years of time series TPV data and prediction enhancing data may be used in the training data set while a most recent year of time series TPV data may be used in the validation data set.

At block 112, the system 206 may output, using the model 2, a second prediction 204 of the total payment volume for the future period of time based on the first prediction and the acquired prediction enhancing data. In some embodiments, where the model 2 is implemented as a machine learning model and the model 1 is implemented as a forecasting model, the second prediction outputted by the model 1 may be more accurate than the first prediction outputted by the model 2. Testing may be performed to validate that the model 2 output 208, when the model 2 is stacked on the model 1, has a greater MAPE than the model 1 alone.

At block 114, the system 206 may compare real-time TPV to the second prediction 204 outputted by the model 2 during a monitoring phase to detect whether and when there are anomalies. For example, the real-time TPV values at each day, hour, minute, and/or second may be compared against the predicted TPV values of the second prediction 204 for the same time steps. An anomaly may be detected where there is a difference between the real-time TPV values and predicted TPV values. The difference may be a predefined threshold difference in values. For example, the difference may be a threshold difference in TPV value between the real-time TPV values and the predicted TPV values over a sustained timeframe. As a simple non-limiting illustration, where a difference between real-time TPV values and predicted TPV values is greater than 100 for 30 hours, an anomaly would be detected if the threshold difference is 60 over a timeframe of 30 hours.

In some embodiments, when the anomaly is detected, the system 206 may perform a remedial action. For example, the system 206 may send an alert to a user device alerting the user through a user interface of the user device of the anomaly. For example, the alert may be an email, text message, phone call, in-app notification, etc. According to various embodiments, the system 206 may automatically adjust a network infrastructure or server capacity for the service provider in response to detecting the anomaly. For example, where the real-time TPV value is greater than the predicted TPV value in the anomaly, the system 206 may adjust or cause an adjustment to (e.g., increase or decrease) the service provider's server traffic capacity. In some cases, the server traffic capacity may be adjusted to accommodate a PPPM of the second prediction 204 of the total payment volume.

In another example, the system 206 may automatically rollback one or more recently released software versions and rollout a previous version in response to detecting an anomaly. For example, a decrease in TPV as compared to the real-time TPV may have been due to an issue with a recent rollout of software, and as such, a rollback may be an efficient temporary solution while a more permanent solution is prepared. In another example, the system 206 may update an interactive voice response software (IVR) to provide incoming calls with an automated response related to the anomaly. As a further example, where the real-time TPV value is greater than the predicted TPV value in the anomaly, an automated response explaining that customer service wait times may be longer due to increased demand may be provided to incoming callers.

In another example, the system 206 may automatically restart machines in response to detecting an anomaly. For example, where the real-time TPV value is less than the predicted TPV value, there may be a first assumption that a machine that facilitates processing transactions could be malfunctioning, and thus, the system 206 may restart the machine as a first measure in understanding why the real-time TPV is less than the predicted TPV. In some embodiments, the system 206 may determine which machines have been impacted in correlation with the anomaly and send a direct system message to the associated support team requesting diagnosis and/or remediation of the machine(s).

In another example, the system 206 may enable log gathering in response to detecting the anomaly. For example, the system 206 may begin automatically entering data into a database that would helpful in debugging to understand what could have caused the anomaly. Conversely, the system 206 may stop automated deletion of logs to preserve data that may be relevant in understanding why the anomaly occurred.

Figure 3:
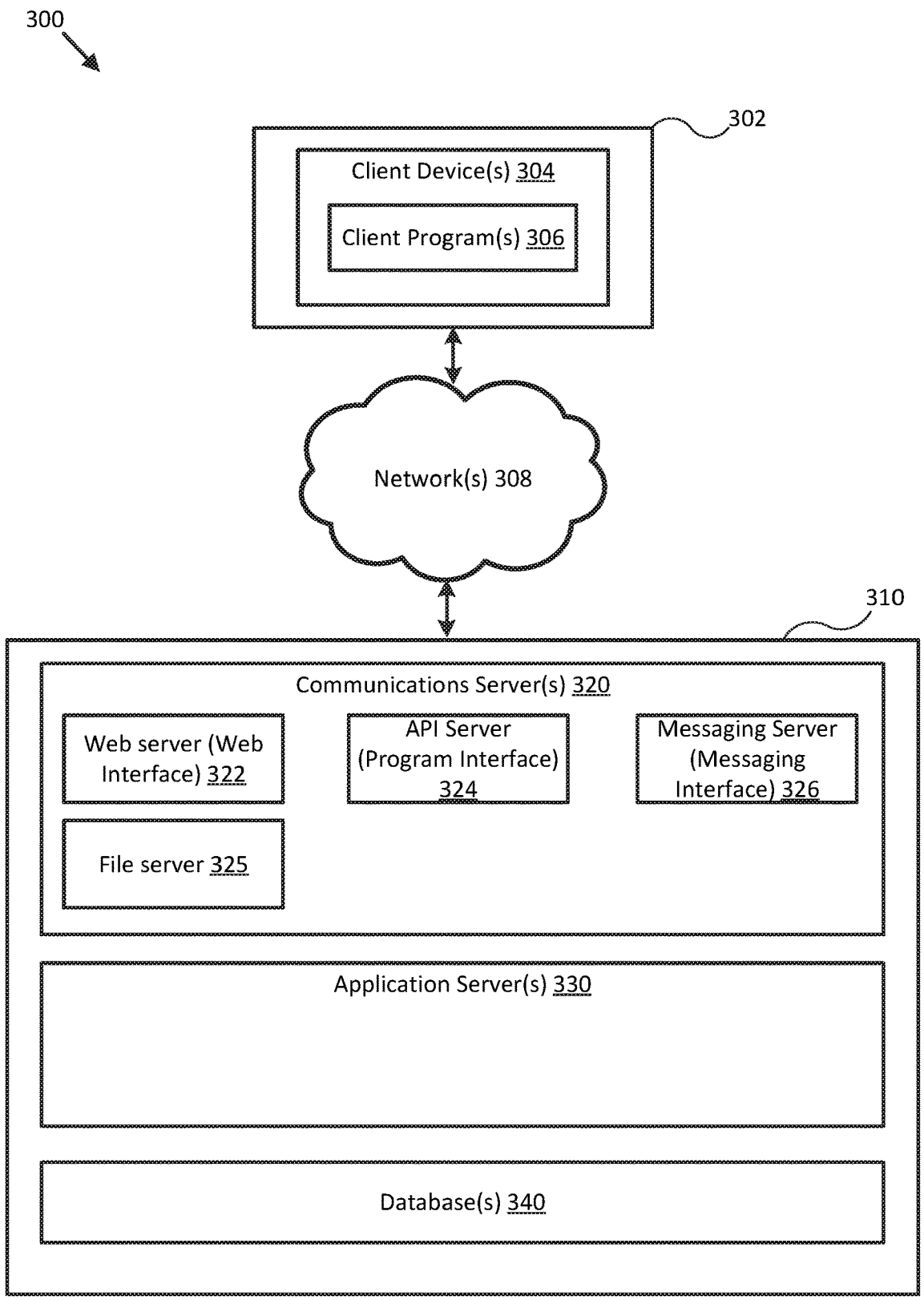
FIG. 3 illustrates a block diagram of a networked system suitable for implementing one or more embodiments of the present disclosure.

FIG. 3 illustrates an exemplary embodiment of a computing system adapted for implementing one or more embodiments disclosed herein. As shown, a computing system 300 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It will be appreciated that the servers illustrated in FIG. 3 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 300 may include, among various devices, servers, databases and other elements, one or more clients 302 comprising or employing one or more client devices 304, such as a laptop, a personal computing device, a mobile computing device, a tablet, a smart phone, an electronic wearable device (e.g., smart watch, virtual reality headset), or other similar devices that a user may readily access.

Client devices 304 generally may provide one or more client programs 306, such as system programs and application programs to perform various computing and/or communications operations. Exemplary system programs may include, without limitation, an operating system (e.g., MICROSOFT® OS, UNIX® OS, LINUX® OS, Symbian OS™, iOS, macOS, Android, Embedix OS, Binary Runtime Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a merchant application, payment/transaction processing application, web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 306 may display various graphical user interfaces (GUIs) to present information to and/or receive information from one or more users of client devices 304. In some embodiments, client programs 306 may include one or more applications configured to conduct some or all of the functionalities and/or processes discussed below.

As shown, client devices 304 may be communicatively coupled via one or more networks 308 to a network-based system 310. Network-based system 310 may be structured, arranged, and/or configured to allow client 302 to establish one or more communications sessions between network-based system 310 and various client devices 304 and/or client programs 306. Accordingly, a communications session between client devices 304 and network-based system 310 may involve the unidirectional and/or bidirectional exchange of information and may occur over one or more types of networks 308 depending on the mode of communication. While the embodiment of FIG. 3 illustrates a computing system 300 deployed in a client-server operating environment, it is to be understood that other suitable operating environments and/or architectures may be used in accordance with the described embodiments.

Data communications between client devices 304 and the network-based system 310 may be sent and received over one or more networks 308 such as the Internet, a Wide Area Network (WAN), a wireless WAN (WWAN), a wireless Local Area Network (WLAN), a mobile telephone network, a landline telephone network, personal area network, as well as other suitable networks. For example, client devices 304 may communicate with network-based system 310 over the Internet or other suitable WAN by sending and or receiving information via interaction with a website, computer application, e-mail, instant message (IM) session, and/or video messaging session. Any of a wide variety of suitable communication types between client devices 304 and system 310 may take place, as will be readily appreciated. In some instances, wireless communications such as Bluetooth, near-field communication, etc. may take place between client device 304 and system 310, such when mobile phones or other personal and/or mobile devices are used by a user in proximity to the system 310.

Network-based system 310 may comprise one or more communications servers 320 to provide suitable interfaces that enable communication using various modes of communication and/or via one or more networks 308. Communications servers 320 may include a web server 322, an API server 324, a file server 325, and/or a messaging server 326 to provide interfaces to one or more application servers 330. Application servers 330 of network-based system 310 may be structured, arranged, and/or configured to provide various online services to client devices that communicate with network-based system 310. In various embodiments, client devices 304 may communicate with application servers 330 of network-based system 310 via one or more of a web interface provided by web server 322, a programmatic interface provided by API server 324, and/or a messaging interface provided by messaging server 326. It may be appreciated that web server 322, API server 324, file server 325, and messaging server 326 may be structured, arranged, and/or configured to facilitate communication with various types of client devices 304, and/or client programs 306 and may interoperate with each other in some implementations.

Web server 322 may be arranged to communicate with web clients and/or applications such as a web browser, web browser toolbar, desktop widget, mobile widget, web-based application, web-based interpreter, virtual machine, mobile applications, and so forth. API server 324 may be arranged to communicate with various client programs 306 comprising an implementation of API for network-based system 310. Messaging server 326 may be arranged to communicate with various messaging clients and/or applications such as e-mail, IM, SMS, MMS, telephone, VoIP, video messaging, IRC, and so forth, and messaging server 326 may provide a messaging interface to enable access by client 302 to the various services and functions provided by application servers 330. File server 325 may be arranged to allow a client to connect to file server 325 to upload files to be stored on file server 325 (e.g., cloud storage server) or to download files that are already stored on file server 325.

Application servers 330 of network-based system 310 may be servers that provide various services to client devices 304. These servers and/or components, which may be in addition to other servers, may be structured and arranged to various tasks further described herein. Application servers 330 may be coupled to and capable of accessing one or more databases 340. Databases 340 generally may store and maintain various types of information for use by application servers 330 and may comprise or be implemented by various types of computer storage devices (e.g., servers, memory) and/or database structures (e.g., relational, object-oriented, hierarchical, dimensional, network) in accordance with the described embodiments. In some embodiments, databases 340 may include several database tables corresponding to specific types of information related to merchant and/or customer accounts, various whitelists, and other network security data described herein.

Figure 4:
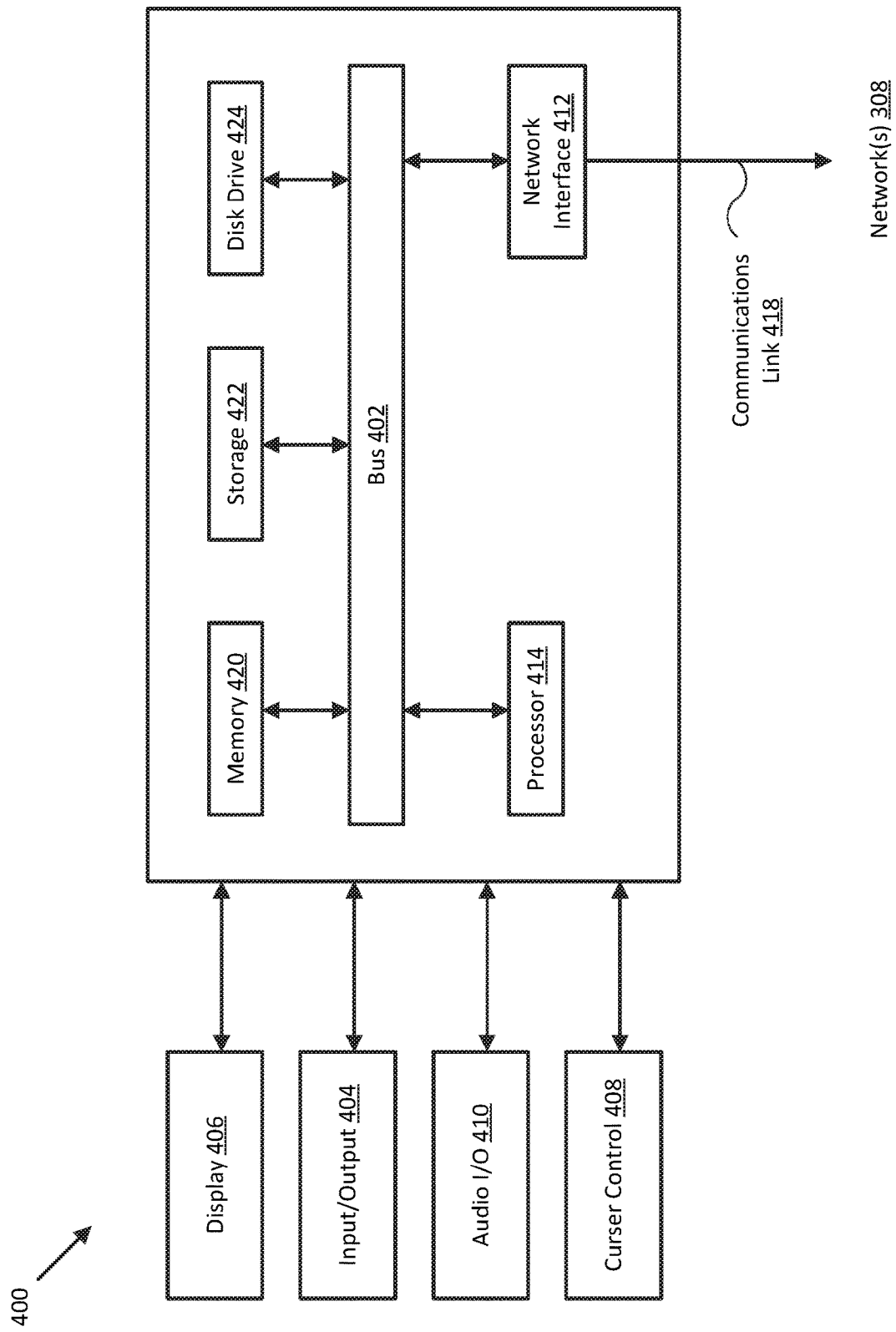
FIG. 4 illustrates a block diagram of a computer system in accordance with one or more embodiments of the present disclosure.

FIG. 4 illustrates an exemplary computer system 400 in block diagram format suitable for implementing one or more devices of the computing system described in reference to FIG. 3. In various implementations, a device that includes computer system 400 may comprise a personal computing device (e.g., a smart or mobile phone, a computing tablet, a personal computer, laptop, wearable device, PDA, any applicable device discussed herein) that is capable of communicating with network 308. For example, a service provider may utilize a network computing device (e.g., a network server) that includes computer system 400 and is capable of communicating with network 308. It should be appreciated that each of the devices utilized by users and service providers may be implemented as computer system 400 in a manner as follows.

Computer system 400 may include a bus 402 or other communication mechanisms for communicating information data, signals, and information between various components of computer system 400. Components include an input/output (I/O) controller 404 that processes a user action, such as selecting keys from a keypad/keyboard, selecting one or more mechanical or touch screen buttons, links, actuatable elements, etc., and sends a corresponding signal to bus 402. I/O controller 404 may also be communicatively coupled to an output component, such as a display 406 and a cursor control 408 (such as a keyboard, keypad, mouse, touchscreen, etc.). In some examples, I/O controller 404 may include an image sensor such as a complementary metal-oxide semiconductor (CMOS) image sensor and/or the like for capturing images and/or video. An audio I/O component 410 may also be included to allow a user to input voice information that may be converted to audio signals that may be interpreted as commands and/or recordable data. Audio I/O component 410 may additionally allow the user to hear audio. In this regard, the audio I/O component 410 may be a microphone(s)/speaker(s).

A transceiver or network interface 412 transmits and receives signals between computer system 400 and other devices, such as another user device, a service provider server, an email server, application service provider, web server, and/or other servers via network 308. In various embodiments, such as for many cellular telephone and other mobile device embodiments, this transmission may be wireless, although other transmission mediums and methods may also be suitable. A processor 414, which may be a micro-controller, digital signal processor (DSP), or other processing component, processes these various signals, such as for display on computer system 400 or transmission to other devices over a network 308 via a communication link 418. Communication link 418 may be a wireless communication in some embodiments. Processor 414 may also control transmission of information, such as cookies, IP addresses, images, videos, and/or other data to other devices.

Components of computer system 400 also include a system memory 420 (e.g., RAM), a static storage component 422 (e.g., ROM), and/or a disk drive 424. Computer system 400 performs specific operations by processor 414 and other components by executing one or more sequences of instructions contained in system memory 420. Logic may be encoded in a computer-readable medium, which may refer to any medium that participates in providing instructions to processor 414 for execution. Such a medium may take many forms, including but not limited to, non-volatile media, volatile media, and/or transmission media. In various implementations, non-volatile media includes optical or magnetic disks, volatile media includes dynamic memory such as system memory 420, and transmission media includes coaxial cables, copper wire, and fiber optics, including wires that comprise bus 402. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 302, network-based system 310, or both. Where applicable, the ordering of various steps described herein may be changed, combined into composite steps, and/or separated into sub-steps to provide features described herein.

The foregoing networks, systems, devices, and numerous variations thereof may be used to implement one or more services and perform one or more operations, such as the services and operations discussed herein.

Embodiments of the present disclosure are not intended to be limited to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system for improved machine learning modeling, comprising:
a non-transitory memory; and
one or more hardware processors coupled to the non-transitory memory and configured to read instructions from the non-transitory memory to cause the system to perform operations comprising:
obtaining total payment volume data corresponding to a past period of time for an entity system that processes electronic transactions;
inputting the total payment volume data into a forecasting model that is configured to predict first total payment volumes for future periods of time;
outputting, using the forecasting model, a first prediction of a total payment volume for a future period of time;
acquiring prediction enhancing data corresponding to the past period of time from one or more servers external to the entity system;
inputting the first prediction and the acquired prediction enhancing data into a machine learning model stacked on top of and distinct from the forecasting model, and trained, using at least (a) historical total payment volume data (b) historical predicted first total payment volumes outputted from the forecasting model and (c) historical prediction enhancing data, to predict second total payment volumes for the future periods of time;
outputting, using the machine learning model, a second prediction of the total payment volume for the future period of time;
comparing the second prediction of the total payment volume to a real-time total payment volume for the entity system; and
based on a detected difference between the real-time total payment volume and the second prediction of the total payment volume, adjusting a server traffic capacity of the entity system to accommodate a predicted peak payments per time interval for processing the electronic transactions.

2. The system of claim 1, wherein:
the historical prediction enhancing data includes one or more of a weekly average of the prediction enhancing data for the past period of time or a monthly average of the prediction enhancing data for the past period of time.

3. The system of claim 1, wherein the acquiring prediction enhancing data comprises determining a central processing unit (CPU) usage allocated to an application, of the entity system, for processing electronic transactions over the past period of time.

4. The system of claim 1, wherein the operations further comprise:
   determining that the difference exceeds a threshold difference corresponding to an alert; and
   sending the alert of the difference to a user device to cause the alert to display in a user interface of the user device.

5. The system of claim 1, wherein the adjusting the server traffic capacity comprises increasing the server traffic capacity.

6. The system of claim 1, wherein the operations further comprise:
   rolling back a most recent release of a software version for the entity system to a previous software version in response to the detected difference between the real-time total payment volume and the second prediction of the total payment volume.

7. The system of claim 1, wherein the prediction enhancing data corresponds to historical data for an index fund.

8. The system of claim 1, wherein the operations further comprise acquiring the prediction enhancing data corresponding to the past period of time from one or more servers internal to the entity system, wherein the prediction enhancing data corresponds to a number of logins recorded for the entity system over the past period of time.

9. A method for improved machine learning modeling, the method comprising:
   obtaining, by a computer system, total payment volume data corresponding to a past period of time for an entity system configured to process electronic transactions;
   inputting, by the computer system, the total payment volume data into a forecasting model that is configured to predict first total payment volumes for future periods of time based at least in part on historical total payment volume data;
   outputting, by the computer system using the forecasting model, a first prediction of a total payment volume for a future period of time;
   acquiring, by the computer system, prediction enhancing data corresponding to the past period of time from one or more computer systems external to the entity system;
   inputting, by the computer system, the first prediction and the acquired prediction enhancing data into a machine learning model trained, using at least (a) the historical total payment volume data (b) historical predicted first total payment volumes outputted from the forecasting model and (c) historical prediction enhancing data, to predict second total payment volumes for the future periods of time, wherein the machine learning model is a different model from the forecasting model;
   outputting, by the computer system using the machine learning model, a second prediction of the total payment volume for the future period of time;
   comparing, by the computer system, the second prediction of the total payment volume to a real-time total payment volume for the entity system; and
   based on a detected difference between the real-time total payment volume and the second prediction of the total payment volume, causing, by the computer system, the entity system to adjust a server traffic capacity to accommodate a predicted peak payments per time interval for processing the electronic transactions.

10. The method of claim 9, wherein the forecasting model includes a linear component and a non-linear component.

11. The method of claim 9, wherein the machine learning model used to predict the second total payment volumes is stacked on top of the forecasting model.

12. The method of claim 9, further comprising:
    obtaining, by the computer system, the real-time total payment volume for the entity system.

13. The method of claim 12, further comprising:
    determining, by the computer system, that the difference exceeds a threshold difference corresponding to an alert indicating an anomaly; and
    sending, by the computer system, the alert indicating the anomaly to a user device to cause the alert to display in a user interface of the user device.

14. The method of claim 9, wherein the acquiring the prediction enhancing data comprises determining a computer memory usage allocated to an application, of the entity system, for processing electronic transactions over the past period of time.

15. The method of claim 9, wherein the acquiring, by the computer system, prediction enhancing data corresponding to the past period of time from the one or more computer systems external to the entity system includes requesting, via an Application Programming Interface (API) call, the prediction enhancing data from the one or more computer systems.

16. A non-transitory machine-readable medium having stored thereon machine-readable instructions executable to cause a computer system to perform operations comprising:
    obtaining total payment volume data corresponding to a past period of time for an entity system configured to process electronic transactions;
    inputting the total payment volume data into a forecasting model that is configured to predict first total payment volumes for future periods of time based at least in part on historical total payment volume data;
    outputting, using the forecasting model, a first prediction of a total payment volume for a future period of time;
    fetching prediction enhancing data corresponding to the past period of time from one or more databases;
    inputting the first prediction and the acquired prediction enhancing data into a machine learning model distinct from the forecasting model and trained, using at least (a) the historical total payment volume data, (b) historical predicted first total payment volumes outputted from the forecasting model, and (c) historical prediction enhancing data, to predict second total payment volumes for the future periods of time;
    outputting, using the machine learning model, a second prediction of the total payment volume for the future period of time;
    comparing the second prediction of the total payment volume to a real-time total payment volume for the entity system; and
    based on a detected difference between the real-time total payment volume and the second prediction of the total payment volume, adjusting a server traffic capacity of the entity system to accommodate a predicted peak payments per time interval for processing the electronic transactions.

17. The non-transitory machine-readable medium of claim 16, wherein the prediction enhancing data includes a plurality of times series data.

18. The non-transitory machine-readable medium of claim 16, wherein the prediction enhancing data corresponds to a tracked number of Application Programming Interface (API) requests received by the entity system at discrete intervals over the past period of time.

19. The non-transitory machine-readable medium of claim 16, wherein the forecasting model is further configured to predict the first total payment volumes for the future periods of time based on identified past periods of time of the historical total payment volume data weighted for seasonality.

20. The non-transitory machine-readable medium of claim 16, wherein the operations further comprise:
reverting a software version of the entity system to a previous version in response to the detected difference between the real-time total payment volume and the second prediction of the total payment volume.

* * * * *